United States Patent
Dykstra

(10) Patent No.: US 6,690,803 B2
(45) Date of Patent: Feb. 10, 2004

(54) CONVERSATION MIRROR/INTERCOM

(75) Inventor: Steven P. Dykstra, Zeeland, MI (US)

(73) Assignee: Johnson Controls Technology Corporation, Plymouth, MI (US)

(*) Notice: Subject to any disclaimer, the term of this patent is extended or adjusted under 35 U.S.C. 154(b) by 0 days.

(21) Appl. No.: 10/324,650

(22) Filed: Dec. 19, 2002

(65) Prior Publication Data

US 2003/0091201 A1 May 15, 2003

Related U.S. Application Data

(62) Division of application No. 09/132,333, filed on Aug. 12, 1998.

(51) Int. Cl.[7] .............................. H04B 1/00; H04R 27/00
(52) U.S. Cl. ........................................... 381/86; 381/82
(58) Field of Search .......................... 381/110, 86, 365, 381/82, 94.5

(56) References Cited

U.S. PATENT DOCUMENTS

| | | | |
|---|---|---|---|
| 3,099,797 A | 7/1963 | Piccinini | 325/312 |
| 3,950,701 A | 4/1976 | Matuoka et al. | 325/312 |
| 3,971,985 A | 7/1976 | Arai | 325/21 |
| 4,006,447 A | 2/1977 | Narbaits-Jaureguy et al. | 340/33 |
| 4,035,589 A | 7/1977 | Parke | 179/100.1 |
| 4,056,696 A | 11/1977 | Meyerle et al. | 179/100 R |
| 4,060,766 A | 11/1977 | Kazuo | 325/22 |
| 4,105,974 A | 8/1978 | Rogers | 325/21 |
| 4,362,907 A | 12/1982 | Polacsek | 179/1 VE |
| 4,389,639 A | 6/1983 | Torii et al. | 340/539 |
| 4,435,845 A | 3/1984 | Timm et al. | 455/228 |
| 4,445,228 A | 4/1984 | Bruni | 381/24 |
| 4,524,461 A | 6/1985 | Kostanty et al. | 455/79 |
| D294,495 S | 3/1988 | Nissley | D12/191 |
| 4,754,486 A | 6/1988 | Stafford et al. | 381/86 |
| 4,768,870 A | 9/1988 | Chen | 350/631 |
| 4,824,159 A | 4/1989 | Fluharty et al. | 296/37.7 |
| 4,875,229 A | 10/1989 | Palett et al. | 379/58 |
| 4,905,270 A | 2/1990 | Ono | 379/58 |
| 4,930,742 A | 6/1990 | Schofield et al. | 248/475.1 |
| 4,934,802 A * | 6/1990 | Fluharty et al. | 359/841 |
| 4,941,187 A | 7/1990 | Slater | 381/86 |
| 4,965,833 A | 10/1990 | McGregor et al. | 381/83 |
| 5,004,289 A | 4/1991 | Lanser et al. | 296/97.12 |
| 5,034,808 A | 7/1991 | Murray | 358/86 |
| 5,039,153 A | 8/1991 | Lindberg et al. | 296/37.7 |
| 5,185,803 A * | 2/1993 | Moyski et al. | 381/86 |
| 5,243,659 A | 9/1993 | Stafford | 381/86 |
| 5,263,199 A | 11/1993 | Barnes et al. | 455/344 |
| 5,321,671 A | 6/1994 | Yoshida | 369/6 |
| 5,481,478 A | 1/1996 | Palmieri et al. | 364/514 R |
| 5,647,011 A | 7/1997 | Garvis | 381/123 |
| 5,666,291 A | 9/1997 | Scott et al. | 395/200.8 |
| 5,754,664 A | 5/1998 | Clark et al. | 381/86 |
| 6,124,886 A | 9/2000 | DeLine et al. | 348/148 |
| 6,246,765 B1 * | 6/2001 | Palett et al. | 379/454 |
| 6,522,754 B1 * | 2/2003 | Long et al. | 381/82 |

FOREIGN PATENT DOCUMENTS

| | | |
|---|---|---|
| IT | 671885 | 10/1964 |
| JP | 60-58734 | 4/1985 |
| JP | 3-231044 | 10/1991 |

* cited by examiner

Primary Examiner—Forester W. Isen
Assistant Examiner—Elizabeth McChesney
(74) Attorney, Agent, or Firm—Foley & Lardner

(57) ABSTRACT

An intra-vehicle communication system includes a surface configured to be mounted to a vehicle interior proximate a first occupant wherein the surface is further configured to display an image of a second occupant of the vehicle. The system further includes an intercom including a microphone supported in close proximity with the surface and a speaker operably coupled to the microphone. In one embodiment, the intercom is further configured to at least partially mute existing audio output from a stereo system.

29 Claims, 1 Drawing Sheet

CONVERSATION MIRROR/INTERCOM

CROSS REFERENCE TO RELATED APPLICATIONS

The present application is a divisional application claiming priority under 35 U.S.C. § 120 from co-pending U.S. patent application Ser. No. 09/132,333 filed on Aug. 12, 1998 by Steven P. Dykstra and entitled CONVERSATION MIRROR/INTERCOM, the full disclosure of which is incorporated by reference.

BACKGROUND OF THE INVENTION

The present invention relates to a vehicle interior accessory comprising an interior mirror and particularly to an intercom system associated with such a mirror.

With the ever increasing popularity of mini vans and sport utility vehicles, which frequently have multiple rows of seats, the ability to effectively communicate between the front and rear seat passengers and, in the case of families, the vehicle operator and children in the rear seat area has become problematical. U.S. Pat. No. 4,934,802 discloses a small, centrally located, convexly curved conversation mirror which allows the vehicle operator to establish eye contact with rear seat areas without the need to move or use the rearview mirror employed for monitoring traffic conditions. When the radio is playing and the like, for example, however, although visual contact may be established, it still is difficult to communicate verbally, particularly with children who may not be attentive. Accordingly, there exists a need for a system by which visual and verbal communication between front seat occupants and mid or rear seat occupants can be effectively established.

SUMMARY OF THE INVENTION

According to one aspect of the present invention, a conversation mirror/intercom for a vehicle includes a vehicle accessory configured to mount to the roof area of a vehicle near a forward vehicle occupant, a conversation mirror coupled to the accessory and an intercom. The conversation mirror is configured to provide visual contact between the forward vehicle occupant and a rearward vehicle occupant. The intercom includes a microphone supported in close proximity with the conversation mirror and a speaker operably coupled to the microphone. The intercom provides verbal communication between the forward vehicle occupant and the rearward vehicle occupant.

According to another aspect of the present invention, an intra-vehicle communication system includes a surface configured to be mounted to a vehicle interior proximate a first occupant wherein the surface is further configured to display an image of a second occupant of the vehicle. The system further includes an intercom including a microphone supported in close proximity with the surface and a speaker operably coupled to the microphone.

According to another aspect of the present invention, a method for a first vehicle occupant to communicate with a second vehicle occupant is disclosed. The method involves viewing the second vehicle occupant while not facing the second vehicle occupant, speaking into a microphone of an intercom having a speaker proximate the second vehicle occupant during the viewing and muting existing audio output from a stereo system while speaking into the microphone.

DETAILED DESCRIPTION OF THE PREFERRED EMBODIMENTS

Figure 1:
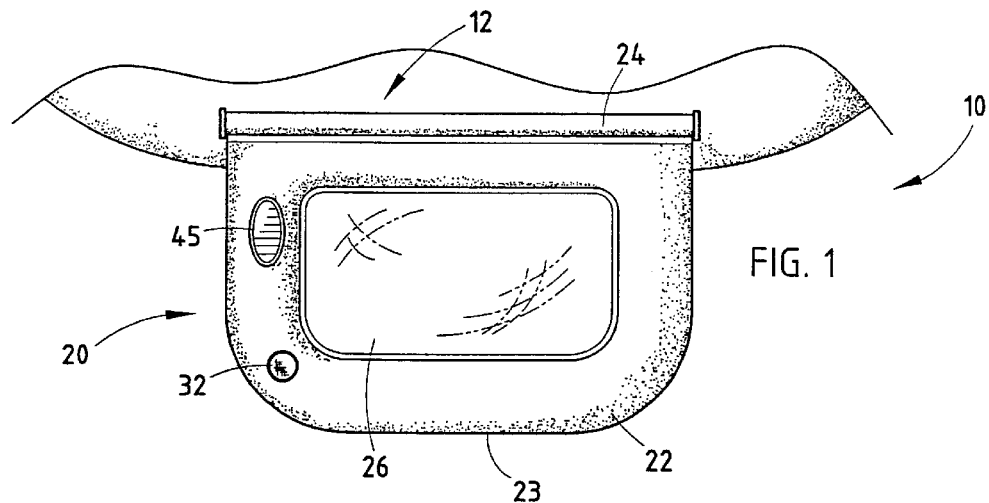
FIG. 1 is a fragmentary front elevational view of a vehicle including a conversation mirror/intercom embodying the present invention and shown in a use position.
Figure 2:
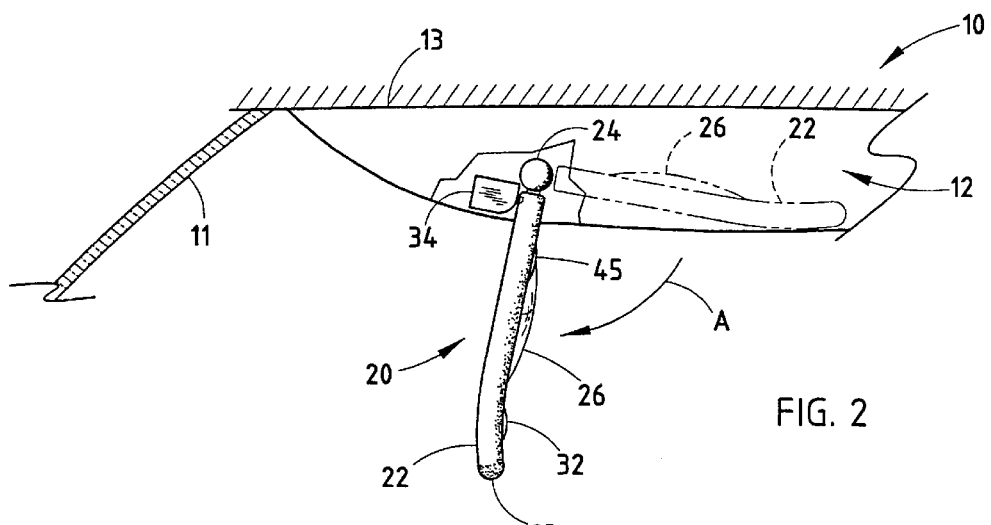
FIG. 2 is a partly broken-away left-side elevational view of the conversation mirror shown in FIG. 1, showing its stored position in phantom form.

Referring initially to FIG. 1, there is shown a vehicle 10, such as a mini van, sports utility vehicle or other passenger carrying vehicle which has a front seat area including an operator seat and a rear seating area spaced therefrom for carrying passengers. Typically, a van may include three rows of seats. The system of the present invention is particularly advantageous for communicating with second and third row seated passengers. In FIGS. 1 and 2, the vehicle 10 includes an overhead console 12 typically mounted to the sheet metal roof 13 (shown schematically in FIG. 2) of the vehicle behind windshield 11 and including a variety of accessories such as sunglass storage compartments, garage door opening transmitters, and overhead electronics such as an electronic compass or the like. Pivotally mounted to the console 12 is a conversation mirror/intercom system 20 of the present invention, which includes a mirror frame 22 pivotally mounted to the console by means of a pivot axle 24 extending between the console 12 and mirror frame 22 and provided with a torque fitting for holding the mirror frame and a convex conversation mirror 26 therein in a stored position, shown in phantom in FIG. 2, or in a selected lowered use position, such as illustrated in FIGS. 1 and 2. Although in the preferred embodiment the mirror frame 22 is pivotally mounted to the console 12, other movable mounting structure, such as a slide-out mount, could also be employed. Mirror 26 is conventionally mounted within the frame and can have a shape as described in the above-identified U.S. Pat. No. 4,934,802, the disclosure of which is incorporated herein by reference. Mirror 26 is preferably convex to provide a relatively unobtrusive and yet effective mirror for allowing the driver to visually establish eye contact with mid and/or rear seat passengers.

Figure 3:
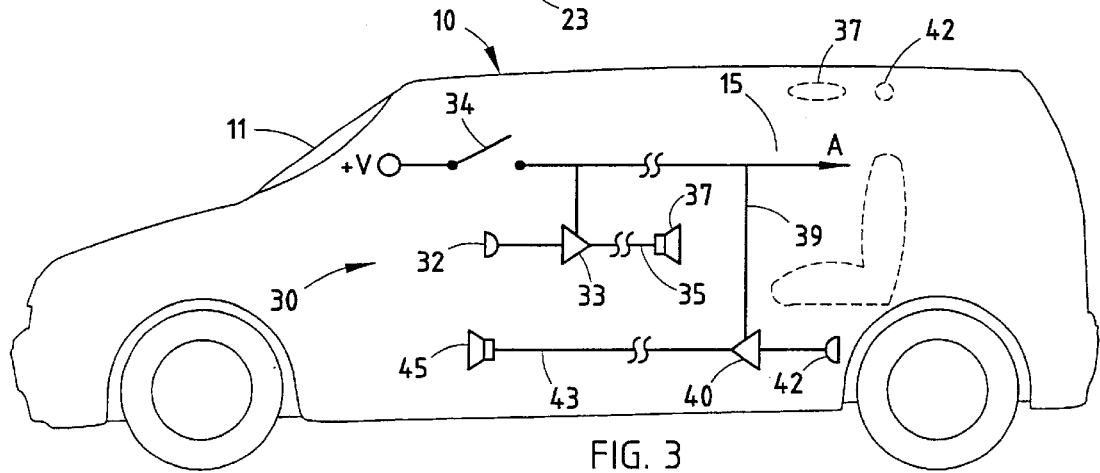
FIG. 3 is an electrical circuit diagram in schematic form of the intercom circuit for the mirror system of the present invention, showing pictorially the location of the transducers in a typical vehicle.

Mirror frame 22 can be made of a suitable polymeric material used in the automotive environment and has sufficient space therein to receive and house at least part of the electronic circuit 30 shown in FIG. 3, including a microphone 32 mounted in the mirror frame in a location where verbal communications from the vehicle operator can clearly be picked up by the microphone 32. Thus, in a preferred embodiment of the invention, the microphone is located in the lower left corner of the mirror frame 22 so that, when the vehicle operator speaks, the voice is picked up by the microphone for subsequent signal processing. The mirror frame may pivot between a stored position, shown in phantom in FIG. 2, within the vehicle console 12 to the lowered use position, as shown in solid lines in FIG. 2 and in FIG. 1, for use. The pivot axle and torque fitting can be of the type used, for example, in vanity mirror covers or pivoted mirrors such as those disclosed in U.S. Pat. Nos. 5,004,289; 5,039, 153; or 4,824,159. An electrical switch 34 is positioned between the mirror frame 22 and console 12 to be actuated by movement of the mirror frame 22 to a use position for applying electrical operating power to the electrical circuit 30, shown in detail in FIG. 3, for activating the intercom circuit for establishing voice communications. The intercom circuit is now described in greater detail in connection with FIG. 3.

In FIG. 3, the vehicle 10 includes an intercom circuit 30 in an overhead console located near the windshield 11, as seen in FIG. 2. The remaining transducers (37, 42), as described below are located in the mid and/or rear seat areas 15 of the vehicle, as shown pictorially in FIG. 3. Intercom circuit 30 includes the microphone 32 which is coupled to an audio amplifier 33 having an input coupled to microphone 32 and an output coupled to a speaker 37 positioned remotely by means of conductors 35 such that the speaker 37 can be positioned remotely and adjacent the rear seat passenger area of a vehicle, such as a van, sport utility vehicle or the like. Thus, speaker 37 may be located in the headliner of the vehicle utilizing a mounting system such as disclosed in U.S. Pat. No. 5,754,664. Amplifier 33 is powered by the vehicle power supply system identified as +V in FIG. 3 through switch 34 such that, when the mirror frame 22 is moved from a stored position to a use position, switch 34 is closed, providing operator power for the amplifier 33. The switch closure 34 may also provide a logic "1" output signal at an output terminal A in FIG. 3, which can be employed by a logic circuit for muting an existing radio or stereo system output, such that verbal communication can be more effectively established. Switch closure 34 also may provide operating power through a conductor 39 to an amplifier 40 associated with the rear seat passenger area and having a microphone 42 located in the rear seat area 15 for picking up voice communications from rear seat passengers which, in turn, is amplified by amplifier 40 and applied by conductors 43 to a speaker 45 which is mounted within the mirror 22, as shown in FIG. 1.

In some embodiments, circuit 30 may include two-way amplifiers and signal handling circuits which allow the microphone 32 and speaker 37 to operate as both a microphone and speaker such that only a single sound transducer need be used in the mirror frame 22 and in the rear seat area. Such conventional circuits and transducers are well known to those skilled in the art.

For use of the system, the operator pivots the mirror frame 22 downwardly from the stored position shown in FIG. 2 by gripping the lower edge 23 of the mirror frame and pivoting the frame about pivot axle 24 adjusting the mirror 26 to a position suitable for viewing the rear seat passengers. In this position, switch 34 is closed, providing power for amplifiers 33 and 40 such that two-way electrically amplified verbal communications between the vehicle operator and rear seat passengers can be established. Simultaneously, the signal from output terminal A can be employed to mute existing audio output from a stereo system, such that verbal communications are not hampered by extraneous audible information. When the communications have been completed, the mirror frame 22 is pivoted in a direction opposite arrow A in FIG. 2 back to the storage position, opening switch 34 and deactuating the amplifiers and returning the stereo system to a normal operating mode such that the front and rear seat passengers can again (perhaps desirably) remain incommunicado.

It will become apparent to those skilled in the art that various modifications to the preferred embodiment of the invention as described herein can be made without departing from the spirit or scope of the invention as defined by the appended claims.

What is claimed is:

1. A conversation mirror/intercom for a vehicle, the mirror/intercom comprising:
    a vehicle accessory configured to mount to a roof area of a vehicle near a forward vehicle occupant;
    a conversation mirror coupled to said accessory, wherein the mirror is configured to provide visual contact between the forward vehicle occupant and a rearward vehicle occupant;
    a mirror frame mounted to the vehicle accessory, the mirror frame configured to move between a stored position and a use position, wherein the conversation mirror is mounted to the mirror frame; an intercom including:
        a first microphone supported in close proximity with the conversation mirror; and
        a first speaker operably coupled to the first microphone, wherein the intercom provides verbal communications between the forward vehicle occupant and the rearward vehicle occupant, and
        an electrical switch coupled to the mirror frame and the intercom, the electrical switch actuated in response to movement of the mirror frame from a stored to a use position to apply operating power to the intercom, the operating power for activating the intercom.

2. The mirror/intercom as defined in claim 1 wherein said mirror is convex.

3. The mirror/intercom of claim 1 wherein the vehicle accessory is an overhead console.

4. The mirror/intercom of claim 3 wherein the overhead console includes at least one of the following: a sunglass storage compartment, a garage door opening transmitter, and overhead electronics.

5. The mirror/intercom of claim 1 wherein the mirror is pivotally coupled to the accessory.

6. The mirror/intercom of claim 1 wherein the mirror frame comprises a frame extending at least partially about the mirror.

7. The mirror/intercom of claim 1 wherein the microphone is at least partially received within the mirror frame.

8. The mirror/intercom of claim 1 wherein the mirror frame is pivotally coupled to the accessory.

9. The mirror/intercom of claim 1 wherein the microphone is coupled to at least one of the accessory, the mirror frame, and the mirror.

10. The mirror/intercom of claim 1 including:
    a second microphone proximate to a rear seat area; and
    a second speaker supported in close proximity to the conversation mirror.

11. The mirror/intercom of claim 1 wherein the mirror has a curvature such that the vehicle driver can see faces of a plurality of rear seat passengers when the accessory is mounted to the roof area.

12. The mirror/intercom of claim 1 wherein the intercom is configured to mute existing audio output from a stereo system when the intercom is in use.

13. The mirror/intercom of claim 1, wherein the mirror is adapted to pivot between a raised position in which the mirror faces a roof of a vehicle and a lowered position in which the mirror faces a rear of the vehicle.

14. A conversation mirror/intercom for a vehicle, the mirror/intercom comprising:
    a vehicle accessory configured to mount to a roof area of a vehicle near a forward vehicle occupant;
    a conversation mirror coupled to said accessory, wherein the mirror is configured to provide visual contact between the forward vehicle occupant and a rearward vehicle occupant; and
    an intercom including:
        a first microphone supported in close proximity with the conversation mirror; and
        a first speaker operably coupled to the first microphone, wherein the intercom provides verbal communications between the forward vehicle occupant and the rearward vehicle occupant;

wherein the intercom is configured to mute existing audio output from a stereo system when the intercom is in use;

wherein the mirror moves between a stored position and a use position, and wherein existing audio output from a stereo system is muted in response to movement of the mirror to the use position.

15. An intra-vehicle communication system comprising:

a surface configured to be mounted to a vehicle interior proximate a first occupant, wherein the surface is further configured to display an image of a second occupant of the vehicle; and an intercom comprising:

a microphone supported in close proximity with the surface; and a speaker operably coupled to the microphone to transmit sound from the microphone, wherein the intercom is configured to at least partially mute the existing audio output from a stereo system;

wherein the surface moves between a stored position and a use position, and wherein existing audio output from the stereo system is muted in response to movement of the surface to the use position.

16. The system of claim 15, a use position, and wherein the intercom is actuated upon movement of the surface from the stored position to the use position.

17. The system of claim 15 including a vehicle accessory, wherein the surface is coupled to the accessory.

18. The system of claim 17, wherein the vehicle accessory is an overhead console.

19. The system of claim 18, wherein the overhead console includes at least one of the following:

a sunglass storage compartment, a garage door opening transmitter, and overhead electronics.

20. The system of claim 17, wherein the surface is pivotally coupled to the accessory.

21. The system of claim 17 including a support and the support comprises a frame extending at least partially about the surface coupled to the accessory, wherein the surface is coupled to the support.

22. The system of claim 21, wherein the microphone is at least partially received within the support.

23. The system of claim 21, wherein the support is pivotally coupled to the accessory.

24. The system of claim 21, wherein the microphone is coupled to at least one of the accessory, the support and the surface.

25. The system of claim 15 wherein the intercom includes:

a second microphone configured to be supported proximate to the second occupant; and a second speaker configured to be supported in close proximity to the surface.

26. The system of claim 15 including a mirror providing the surface, wherein the surface reflects the image.

27. The system of claim 26, wherein the mirror is convex.

28. An intra-vehicle communication system comprising:

a surface configured to be mounted to a vehicle interior proximate a first occupant, wherein the surface is further configured to display an image of a second occupant of the vehicle; and an intercom comprising:

a microphone supported in close proximity with the surface, and a speaker assembly operably coupled to the microphone to transmit sound from the microphone, wherein the intercom is configured to at least partially mute existing audio output from a stereo system;

wherein the surface is actuatable between an image displaying mode and image non-displaying mode and wherein the intercom is configured to mute existing audio output in response to actuation of the surface to a display mode.

29. The system of claim 28, wherein the surface is moveable between a viewing position in which the surface is in the image displaying mode and a stored position in which the surface is in the image non-displaying mode.

* * * * *

UNITED STATES PATENT AND TRADEMARK OFFICE
CERTIFICATE OF CORRECTION

PATENT NO.     : 6,690,803 B2
DATED          : February 10, 2004
INVENTOR(S)    : Steven P. Dykstra It is certified that error appears in the above-identified patent and that said Letters Patent is hereby corrected as shown below:

Column 4,
Line 6, replace "mirror is mounted to the mirror frame; an intercom" with -- mirror is mounted to the mirror frame; --.
Line 7, replace "including:" with -- an intercom including: --.

Column 5,
Line 26, delete "a use position, and".
Line 39, delete the words "and the".
Line 40, delete the words "support comprises a frame extending at least partially about".
Line 41, delete the first use of the words "the surface".
Line 42, insert -- and the support comprises a frame extending at least partially about the surface -- after the phrase "coupled to the support".

Column 6,
Line 24, replace "," with -- ; --.

Signed and Sealed this

Eighth Day of June, 2004

JON W. DUDAS
*Acting Director of the United States Patent and Trademark Office*